No. 809,461. PATENTED JAN. 9, 1906.
C. S. PIERCE.
KETTLE AND LID SECURING AND OPERATING MEANS THEREFOR.
APPLICATION FILED APR. 24, 1905.
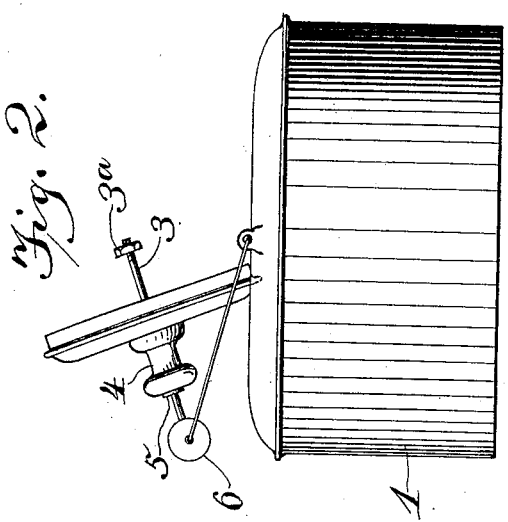
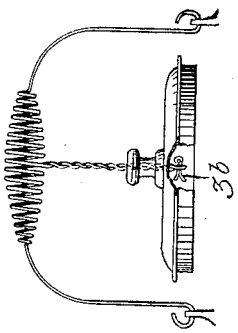
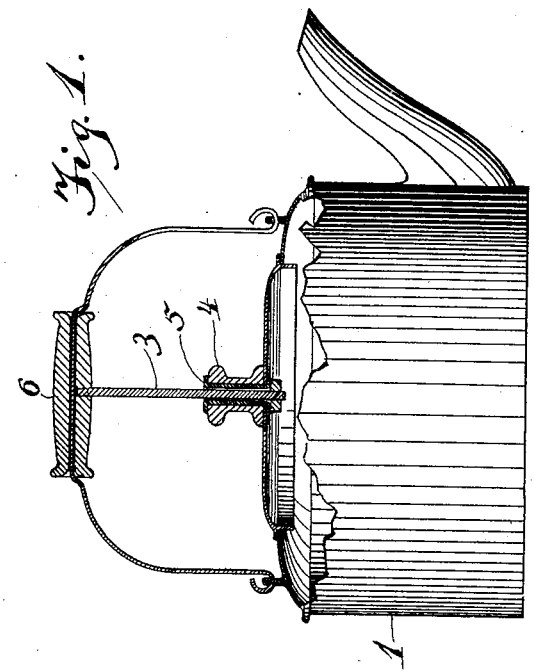
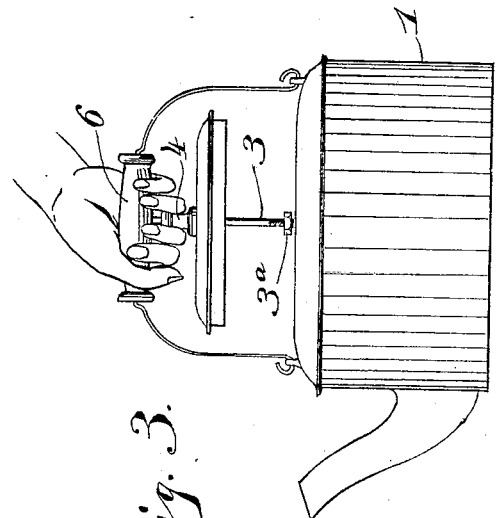
WITNESSES:
Wellington W. Blewett
Pearl Martin
INVENTOR.
Charles S. Pierce
BY James T. Watson
ATTORNEY.

UNITED STATES PATENT OFFICE.

CHARLES S. PIERCE, OF DULUTH, MINNESOTA.

KETTLE AND LID SECURING AND OPERATING MEANS THEREFOR.

No. 809,461.  Specification of Letters Patent.  Patented Jan. 9, 1906.

Application filed April 24, 1905. Serial No. 257,028.

*To all whom it may concern:*

Be it known that I, CHARLES S. PIERCE, a citizen of the United States, residing at Duluth, in the county of St. Louis and State of Minnesota, have invented certain new and useful Improvements in Kettles and Lid Securing and Operating Means Therefor; and I do hereby declare the following to be a full, clear, and exact description of the invention, such as will enable others skilled in the art to which it appertains to make and use the same.

My invention relates to kettles and lid securing and operating means therefor, and has for its object the provision of means for adjustably securing the lid to a kettle or analogous receptacle.

It has for a further object the provision of improved means whereby said lid may be conveniently lifted by fingers of the same hand by which the kettle is lifted and in such manner that the lid will form a shield to protect the hand from steam.

With these and other objects in view it consists of the construction, combinations, and arrangements of parts hereinafter described and claimed.

In the drawings, Figure 1 is a side elevation, partly in central vertical longitudinal section, of a kettle on which my said invention is employed, showing the lid in closed position. Fig. 2 is a rear elevation of said kettle, showing said lid in one of its lifted positions. Fig. 3 is a reduced opposite side elevation showing said kettle in manually-suspended position and showing said cover in another of its raised positions. Fig. 4 is a reduced side elevation of a modified form of my said invention, showing an integral bail and lid-supporting rod.

In the drawings, 1 is the body portion of a kettle, and 2 is the lid thereof. Said lid is apertured for the passage of a bolt 3, which extends through a finger-hold or button 4, secured in any suitable manner to said lid, as by a thimble 5, projected through said button and through said aperture and flanged at its lower end against the inner face of said lid and flanged at its upper end against the upper end of said button. Said bolt is provided on its lower end with a lid-retaining means, as a nut $3^a$ or a split key $3^b$, which is preferably removable, so that, if desired to facilitate packing for shipment, said lid may be removed from that end. The upper end of said bolt is attached to the handle 6 of said kettle in any suitable manner, as by screwing it into said handle, or, if desired, said bolt may form an integral part of the handle, as shown in the modified form thereof. (Shown in Fig. 4.) No hinges are employed other than the handle or bail itself, if that may be considered a hinge; but by swinging the handle or bail in either direction the lid may be moved to any of several convenient positions and upon raising the handle to vertical position the lid will readily fall to closing position on said kettle and will then hold the bail upright, so that it will not scorch or burn or get hot. It is obvious that the cover will not accidentally drop off the kettle and get under foot or be lost.

I am aware that it is not broadly new to secure the cover to the bail by a centrally-arranged sliding rod; but I do not know of any such construction prior to my invention which will permit the cover to be raised by fingers of the same hand by which the kettle is at the same time suspended without danger that the rod will strike the palm or wrist or engage the dress-sleeve of the operator.

In operation the bail may be swung to either side to tilt the cover, or said cover may be slightly lifted and the bail swung to one side and the cover dropped, in which case if the handle be journaled on the bail the cover may drop bottom down to one side of the kettle, or the handle may be engaged by the thumb and two fingers extended down to grasp the button and the hand and fingers and arm then contracted to lift said cover and at the same time lift the kettle. In such case the lid will form a shield for the hand to protect it from directly-rising scalding steam or water.

While I have shown my device applied to kettles, it may obviously within the scope and spirit of my invention be applied to various forms of pails or buckets or receptacles of many other kinds.

Having now described my invention, what I claim, and desire to secure by Letters Patent, is—

1. The combination of a kettle or similar receptacle provided with a handle or bail having a downwardly-extending member intermediate of its ends, a kettle-lid slidably mounted on said downwardly-extending member, and a finger-hold on said lid whereby the same may be manually lifted or slid upon said rod.

2. A kettle or equivalent utensil, having a removable lid, a button mounted on said lid, a rod or bolt extending loosely through said button and lid and secured at one end to a handle provided for lifting said kettle and adapted to extend over the top of the same.

3. A kettle, or equivalent utensil, having a handle adapted to extend over the same, a rod terminating at one end at or in said handle and immovable therein and adapted to extend downwardly therefrom, a kettle-lid journaled on said rod and adapted to slide upon the same, and a finger-hold mounted on said lid whereby the same may be manually lifted, or slid upon said rod.

4. The combination of a kettle, a lid for the same, a button mounted upon said lid, a thimble projected through said button and lid and secured in such position, a swinging handle adapted to extend over said kettle, a rod or bolt terminating at one end at or in said handle and immovable therethrough and extending at the opposite end loosely through said thimble, and lid-retaining means engaging said rod or bolt at the opposite side of said lid from said handle, substantially as described.

In testimony whereof I hereunto affix my signature in presence of two witnesses.

CHARLES S. PIERCE.

Witnesses:
   JAMES T. WATSON,
   WELLINGTON M. BLEWETT.